US009313558B1

(12) United States Patent
Mandecki et al.

(10) Patent No.: US 9,313,558 B1
(45) Date of Patent: Apr. 12, 2016

(54) TAGGING OF METAL PINS FOR MOUNTED OBJECTS WITH LIGHT-ACTIVATED MICROTRANSPONDERS

(75) Inventors: Wlodek Mandecki, Princeton, NJ (US); Ziye Qian, Monroe Toenship, NJ (US); Richard Morris, Ringoes, NJ (US); Garry Thomas Jolley-Rogers, Kaleen (AU); David Keith Yeates, Flynn (AU); Philip John Suter, Chiltern Victoria (AU); James Reginald Croft, Campbell (AU); Edith Margaret Cawsey, Kaleen (AU); Jeffrey Michael Webb, Guelph (CA)

(73) Assignee: Pharmaseq Inc., Monmouth Junction, NJ (US)

( * ) Notice: Subject to any disclaimer, the term of this patent is extended or adjusted under 35 U.S.C. 154(b) by 396 days.

(21) Appl. No.: 13/239,984

(22) Filed: Sep. 22, 2011

Related U.S. Application Data

(60) Provisional application No. 61/386,197, filed on Sep. 24, 2010.

(51) Int. Cl.
*H04Q 5/22* (2006.01)
*G08B 13/14* (2006.01)

(52) U.S. Cl.
CPC ..................... *H04Q 5/22* (2013.01)

(58) Field of Classification Search
CPC ........ G08B 13/14; A61F 13/15; D05B 19/02; G06F 9/00; A44B 99/00; A45F 5/00
USPC ........................................................ 340/10.1
See application file for complete search history.

(56) References Cited

U.S. PATENT DOCUMENTS

| | | | |
|---|---|---|---|
| 5,641,634 A * | 6/1997 | Mandecki | 435/6.19 |
| 6,850,160 B2 * | 2/2005 | Rubinstein | 340/568.1 |
| 7,098,394 B2 | 8/2006 | Armer et al. | |
| 7,412,898 B1 * | 8/2008 | Smith et al. | 73/761 |
| 7,791,481 B2 * | 9/2010 | Landt et al. | 340/572.1 |
| 7,849,807 B2 * | 12/2010 | Suzuki et al. | 112/470.03 |
| 8,402,612 B2 * | 3/2013 | Wein et al. | 24/303 |
| 2006/0084934 A1 * | 4/2006 | Frank | 604/362 |
| 2009/0278662 A1 * | 11/2009 | Sanchez et al. | 340/10.1 |

OTHER PUBLICATIONS

U.S. Appl. No. 13/239,779, filed Sep. 22, 2011 for "Tagging of Small Containers for Biological and Chemical Samples with Light-Activated Microtransponders", 33 pages.
U.S. Appl. No. 13/239,801, filed Sep. 22, 2011 for "Tagging of Tissue Carriers with Light-Activated Microtransponders", 29 pages.

* cited by examiner

*Primary Examiner* — Jennifer Mehmood
*Assistant Examiner* — John Mortell
(74) *Attorney, Agent, or Firm* — Moser Taboada (57) ABSTRACT

Provided herein, among other things, is an assembly comprising a pin or a piece of jewelry and a transponder affixed thereto. The transponder can be a very small, light-triggered transponder ("MTP").

18 Claims, 4 Drawing Sheets

TAGGING OF METAL PINS FOR MOUNTED OBJECTS WITH LIGHT-ACTIVATED MICROTRANSPONDERS

This application claims the priority of U.S. Ser. No. 61/386,197, filed Sep. 24, 2010, which is incorporated by reference herein.

Embodiments of the present invention generally relate to small metal pins tagged with light-activated microtransponders, and methods of making and using the same. Such metal pins are often used for affixing insects to surfaces in taxonomy collections, and are often called "entomological pins" or "ento-pins".

As described in U.S. Pat. No. 7,098,394, very small, light-activated microtransponders are available to provide identifiers, for example as identifiers used in conjunction in nucleic acid assays. These have proven to be stable under a number of challenging conditions.

Radio frequency identification devices have been in use for some time, including for object tagging. Systems are available for example from Avid Technology, Inc. (Tewksbury, Mass.), Lutronic International (Rodange, Luxemburg) and Bio Medic Data Systems, Inc. (Seaford, Del.). In animal use, these systems are encapsulated, such as in biocompatible glass. Given the encapsulation, and the need for antennae, the smallest of these devices is believed to be just less than 0.84 mm by about 3 or 4 mm. As the transponder trigger is radio waves, typically there is no substantial issue with the orientation of the transponder once injected.

Background information on curating natural specimen collections can be found at:
http://www.nps.gov/history/museum/publications/conserveogram/11-08.pdf:
Riley, C. V. (1892). Directions for Collecting and Preserving Insects. Smithsonian, F(39), 416-416. doi: 10.1038/046416a0.
Millar, I., Uys, V., & Urban, R. (2000). A Safrinet Manual for Entomology And Collecting and Preserving Insects and Arachnids. RC-PPRI, Pretoria.
Schauff, M. E. (2007). Collecting and Preserving Insects and Mites: Techniques and Tools. Systematic Entomology Laboratory, USDA, National Museum of Natural History, NHB 168.
Walker, A., & Crosby, T. (1988). The Preparation and curation of insects. Entomology Division, Department of Scientific and Industrial Research, New Zealand.

Entomological methods have been standardized over the past 200 years to meet the aesthetic needs of collectors and preserve high quality research material. Most dry Insect specimens are mounted on pins so that they may be handled and examined with the least possible damage (Borrer, et al. 1989).

Entomological pins have particular qualities and there are few manufacturers worldwide. They must be stainless steel or they will corrode and eventually ruin the specimen. The pin heads must be durable, resistant to damage and not any impose strain upon users hands when handled in bulk. Typically, the heads of entomological pins are made of wound brass. Pins have a number system that is relative to their thicknesses, but numbers 2 and 3 are the most commonly used.

Larger insects are pinned through their bodies using a general purpose size entomological pin (number 3). Small, fragile specimens, are mounted on points or on card using thinner pins, size 0 or minuten (a very fine pin), with a second larger pin for handling. The pinned specimens can be kept in unit trays, which can be kept in insect drawers. In large collections these drawers are housed in entomology cabinets. Specimens are moved as taxonomy changes. Placement of specimens in unit trays and storage cabinets reflects the evolution of taxonomic ideas in a collection.

Insects in research collections require labels. These labels must last as long as the specimens. Legibility and longevity necessitate the use of good quality paper and durable ink. Label paper must have a high standard of pH neutrality, colour fastness, strength, and smoothness of writing surface. The importance of a good quality paper can be easily underestimated. 50 years may pass before faults begin to appear. The placement of labels must not interfere with the specimen. Insect labels for most pinned specimens may vary somewhat in size but ideally should not be larger than 2×1 cm. Labels are place on the pin below the insect with the top of the labels facing right.

Any insect specimen may have many labels. Content on the label follows a standard format throughout the world: locality, date, and collector are recorded in that order. Other useful information can be given on supplementary labels added underneath, e.g., expedition, voucher specimen, determination, and type specimen labels. Researchers may assign different taxonomic identities to a specimen over time. In which case, each researcher should add their own label. Long established practice has it that a label should never be removed.

Entomology collections face great difficulties in the management of information in these labels especially changes in the taxonomic identity of specimens.

There are 2.5-3.0 billion biological specimens in the world's natural history collections, and a large proportion of these are insects on entomological pins. These pinned specimens are the primary data of insect taxonomy and also represent a global resource for understanding the past and present distributions, and identities, of insects—and their impacts upon health and the economy. However, the data associated with only a small fraction of these pinned insects has been digitized so that it can be harvested and used by other scientists—as the raw material for taxonomy and systematics research. This is largely due to the tremendous cost of manually transferring label data of pinned insects into electronic databases. Here we describe a breakthrough in the centuries-old design of insect mounting that incorporates a novel, light-activated miniaturized a radio frequency identification tag (RFID) in the pin head (MTPs, defined below). This tiny (500 μm×500 μm square), near indestructible, silicon tag can encode the serial number associated with the specimen, but most critically it can be read remotely using a scanner, and indexed with a complete descriptive database stored in a computer. This means that information can be obtained from the specimen without physically touching it. This will drive a step-increase in the rate of specimen data digitization, unlocking the vast storehouse of critical information in entomological collections for the digital age. For the first time it will allow seamless, real-time connection between the physical specimen and related information on the web. The technology can easily be generalized to many natural history specimens. It includes a novel means to fit chips onto existing very small specimens in a manner with minimal chance of harm and no impact upon long term curation.

SUMMARY

Embodiments of the present invention generally relate to metal pins with affixed light-activated microtransponders.

Provided, among other things, is a metal pin with an affixed light-activated microtransponder.

Where this specification describes methods of reading the affixed MTPs or methods of affixing the MTPs, such methods are within the invention. Where this specification describes devices for reading the MTPs as affixed to the metal pins, such devices are within the invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

The reading face of an exemplary MTP (defined below) is shown schematically in FIG. 1. The MTP has photocells 1, antenna 2, logic circuits 3, and memory circuits 4.

A wand device for reading an MTP is illustrated in FIG. 2, with a U.S. quarter superimposed for scale.

The electronic features of a wand device for reading an MTP are shown in FIG. 3.

Panel A of FIG. 4 shows an example of an insect mounting pin, and Panel B illustrates the pin after flattening of the head of the pin.

Panel A of FIG. 5 provides an example of insects attached to metal pins in an entomological collection (source: the internet). Panel B shows how to position labels on the pin. Panel C provides the proper attachment of the card point. Sources of the picture and drawings: A—internet; panels B and C—Ref. 20.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

As described in U.S. Pat. No. 7,098,394, very small, light-triggered transponders ("MTPs" or "p-Chips") are available to provide identifiers, for example as identifiers used in conjunction in nucleic acid assays (e.g., assays using DNA, RNA, or analogs thereof). These have proven to be stable under physiological conditions. Such devices have also provided a substrate on which new approaches for using metal particles have now been explored.

These MTPs are generally sided, in that the photocell/RF circuitry is formed on one face, and the other major face is generally silicon—and can be a product of height reduction by back grinding. The circuitry face is generally protected by a passivation layer, such as of silicon dioxide, silicon nitride or mixtures, or multiple such layers.

A MTP has a length, width and height. A planar MTP is one where the height is 50% or less than the smallest of the length or width. In some embodiments, the height is 40% or less, 35% or less, 30% or less, 25% or less, or 20% or less, than the smallest of the length or width. MTPs used in the invention are often, but not necessarily, square or rectangular, consistent with a focus on low cost of production. A MTP is one where the longest of the length or width is 1.2 mm or less. In some embodiment, the longest of the length or width is 1.1 mm or less, 1.0 mm or less, 0.9 mm or less, 0.8 mm or less, 0.7 mm or less, or 0.6 mm or less. or 0.5 mm or less, or 0.4 mm or less, or 0.3 mm or less, or 0.25 mm or less, or 0.2 mm or less, or 0.15 mm or less. In one embodiment, the microchip is 600 micron×600 micron×100 or 120 micron.

Definition of Pin

Figure 4:
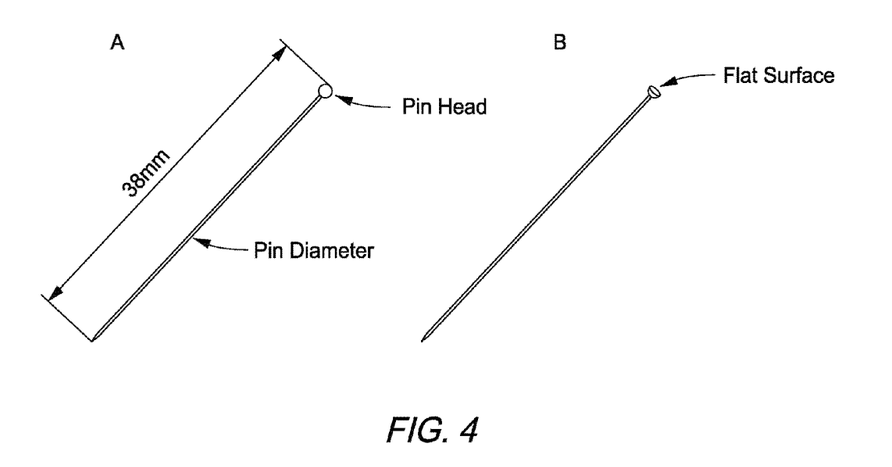
Figure 5:
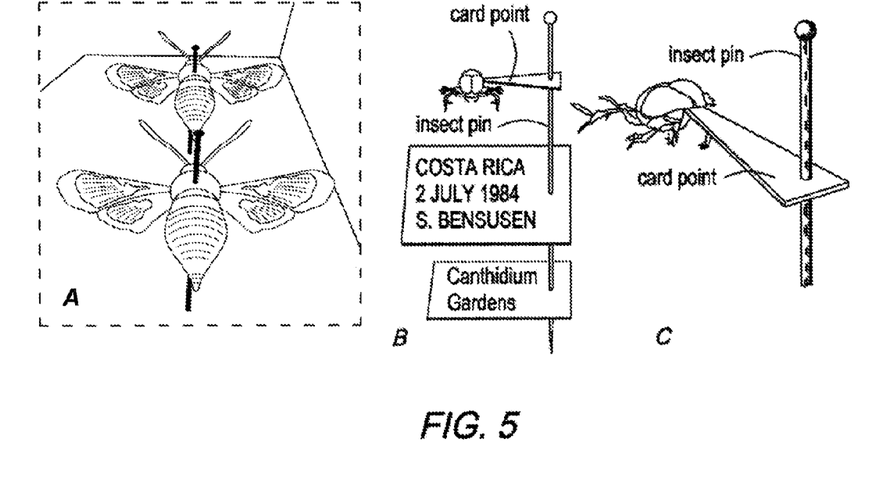
Figure 6:
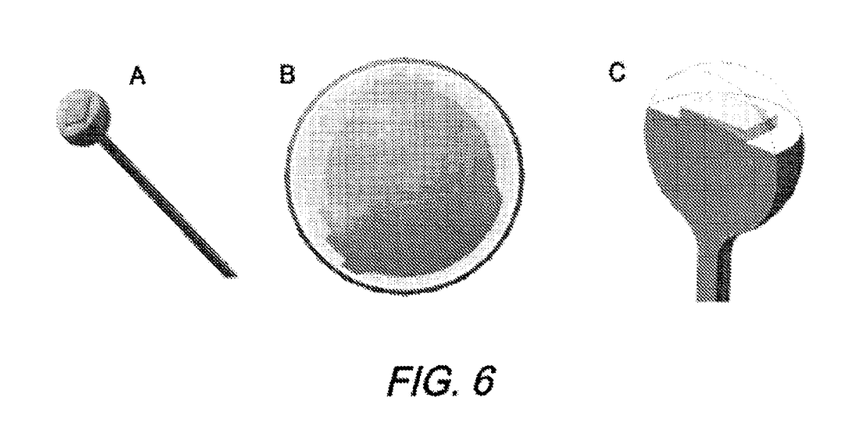
FIG. 6 provides three views of the microtransponder glued to the head of a pin and covered with an adhesive forming a dome. Panel A: an overall view of the pin. Panel B: a view from the axis of the pin, from above the head of the pin. Panel C: a cross-section of the pin showing: 1—the pin; 2—the microtransponder and 3—the adhesive dome.
Figure 7:
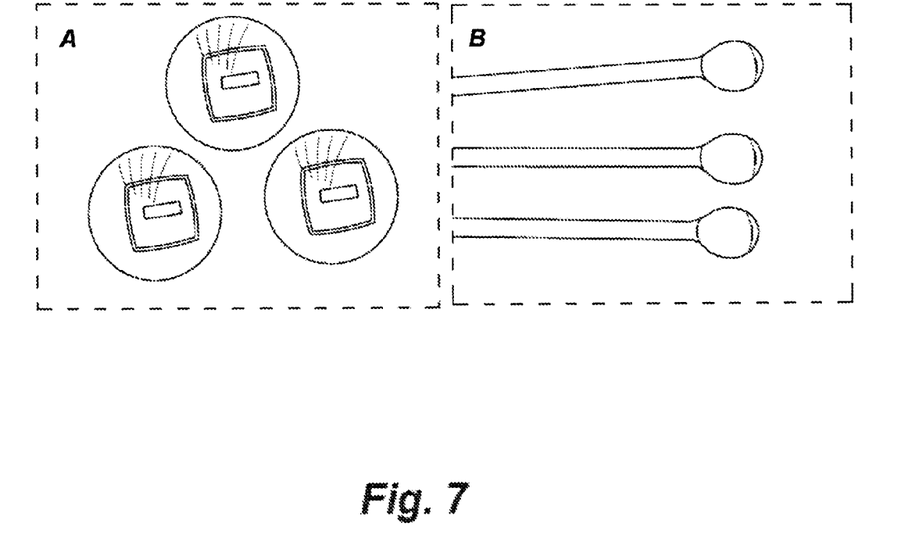
FIG. 7 provides two photographs of the pin-microtransponder assemblies. Panel A: a view from the axis of the pin, from above the head of the pin. Panel B: a side view of the pins from Panel A.

The pin is an elongated object, frequently made of metal, plastic or wood, one end of which has a bulky, often oval shape, called the head of the pin, the other end of which is sharpened. The diameter of the bulky end is typically larger than the diameter of the elongated portion of the pin. The typical length of pins used in natural specimen collections is between ½ of an inch to 3 inches. The diameter of pins used in natural specimen collections can vary from $1/100$th of an inch to $1/10$th of an inch. The axis of the pin goes through the center points of the cross-sections of the elongated portion of the pin, such that, for example, MTP pin shown in FIG. 6C is approximately perpendicular to that axis. An example of the pin is shown in FIG. 4.

Procedure for Embedding MTPs into Heads of Natural Specimen (e.g., Insect) Pins

Figure 1:
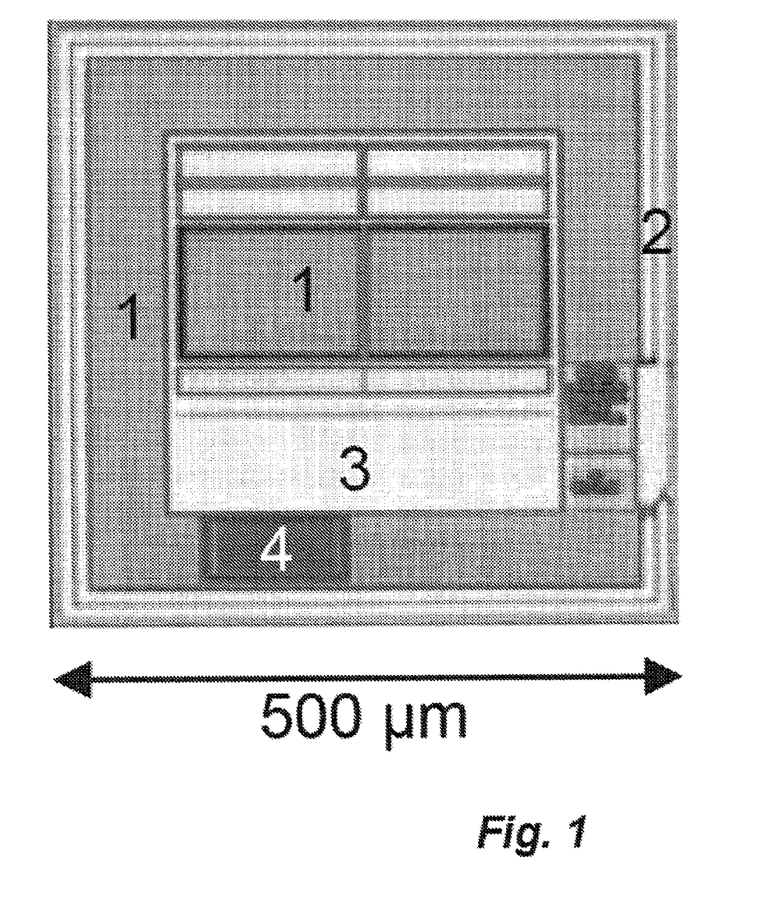

The objective of the project was to attach MTPs to insect pins. Insect pins are often used in preparing displays of insects in taxonomy studies. Three types of commercial insect pins (see Table 1) exemplified by the pin shown in FIG. 1 were used to establish the methodology. Two suppliers of the pins are listed in Ref. [23]. Below we describe how the MTPs were placed on the heads of different types of pins. The MTPs were covered with a transparent material so that they are protected from damage, and the resulting modified pin can be handled with ease.

Materials Used

The dimensions of the pins used in the project are given in Table 1.

TABLE 1

Types of insect pins used.

| Type | Length (mm) | Pin Diameter (μm) | Pin Head Diameter (μm) | Diameter of Flat Surface On Pin Head (μm) |
| --- | --- | --- | --- | --- |
| 1 | 38 | 250 | 762 | 710 |
| 2 | 38 | 450 | 1143 | 740 |
| 3 | 38 | 500 | 1320 | 740 |

Procedure

Figure 2:
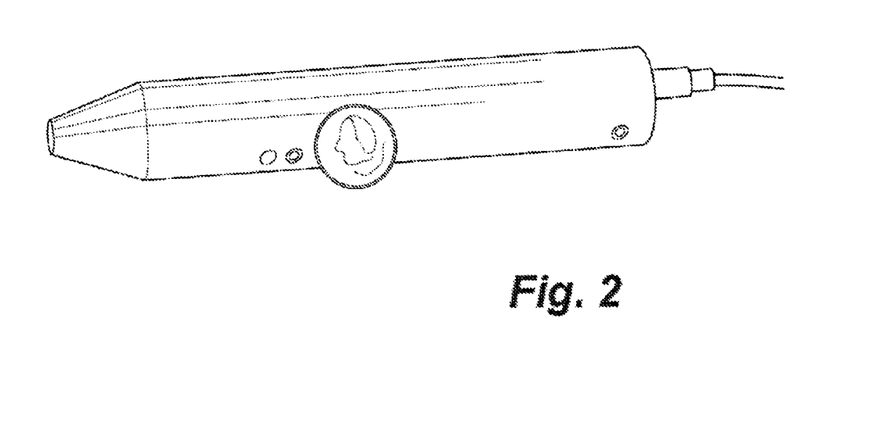

The procedure to place the MTP on the head of the pin involved the following steps:

1. Grind the top of the pin head. The heads of entomological pins were ground using a Craftsman sanding cutter (Model Number 572.530320) to a flat surface. A schematic view of the modified pin head is shown in FIG. 2. The diameter of the pin head is 1320 μm, so a MTP, which is 500 μm on the side and 707 μm diagonally, can comfortably fit on the shaved head (Type 3) as indicated in Table 1.

2. Adhere the MTP to the shaved pin head. The MTPs were glued with the following archival quality epoxy adhesive: Scotch-Weld DP-100 Plus Clear (made by 3M). 3M's MSDS shows peak strength at 2 wks maintained at 1 Mnth with some decrease (3900 PSI to 3400 PSI). The glue exhibits acceptable tolerance to common agents in a collection, including acetone, ethanol, etc. The chip was positioned in the center of the shaved area. A toothpick is used to apply a small amount (approx. 2-5 nanoliters) of the epoxy glue to the flat surface of the pin head, then placed a MTP on it under a microscope (Leica), making sure the MTP's electronic surface is facing up (visible). The glue is cured for about 30 minutes.

Figure 3:
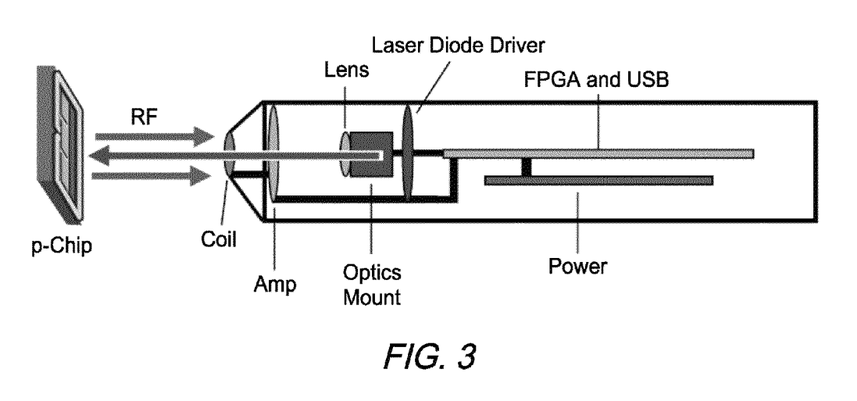

3. Place transparent sealant over the MTP on the pin head. The purpose was to prevent MTPs from being scratched and damaged, and to facilitate user's manual manipulations with the pins. A suitable sealant was the epoxy (see above) which is colorless and transparent. We placed a larger (than in Step 2) amount of the adhesive (approx. 100-300 nanoliters), covering the MTP and the entire flattened head area with it. We kept the pin in a vertical position for 30 minutes to allow for curing of the sealant. The schematic view of the finished pin is shown in FIG. 3.

4. Test for RF functionality of the glued MTP. The IDs of the glued MTP were read after 24 hours using the PharmaSeq ID reader (wand).

Results

Eight pins with MTPs attached to the pin heads were made. The MTP IDs could be easily read from all tagged pins made. The pin types and MTP ID values are listed in Table 2. Pictures of Type 3 pins are shown in FIGS. 4a and 4b. Mounting MTPs to flattened entomology pins is a workable approach to tagging the pins.

TABLE 2

MTP IDs read from 8 pins.

| Type | Length (mm) | Pin Diameter (μm) | Pin Head Diameter (μm) | MTP IDs on Pin Heads |
|---|---|---|---|---|
| 1 | 38 | 250 | 762 | 107 |
| 2 | 38 | 450 | 1143 | 146 |
| 3 | 38 | 500 | 1320 | 593, 366, 591, 380, 647, 942 |

It will be recognized that the pin can be formed with an appropriate support surface for the MTP (i.e., with an analog of the flat top formed above by grinding). It will further be recognized that while epoxy-type polymers are conveniently used to affix the MTPs, other materials that allow appropriate light transmission may be used. Such materials can have a degree of opacity. Such material can include, for example, an inorganic-organic hybrid glass material. (See, Wojcik et al., 2005. Novel glass protective coatings for high temperature applications. Proceedings of 54th International Wire & Cable Symposium, 368). Hybrid glass represents a combination of polymer and certain oxides like silica or silica-alumina and bonds covalently to most metals, silicon wafer, glass or plastic substrates. The substrate can be roughened to extend the materials that can adhere and provide light transmission.

The pin can also have a cavity formed therein into which the MTP is deposited. The MTP-filled cavity can be encased with polymer, hybrid glass, sputtered silica, or the like. The cavity can provide protection from physical abuse.

The illustrative ID reader (wand) of FIG. 2 is a hand-held device that can connect to a standard PC and capable of reading the serial number (ID) of individual MTPs. The wand can be, for example, USB-powered and contain a USB 2.0 transceiver microcontroller, a field programmable gate array (FPGA), power converters and regulators, a laser diode with programmable current driver, an optical collimation/focusing module, and a tuned air coil pickup with a high gain, low noise differential RF receiver with hysteretic comparator data slicer. The FPGA code in the ID reader can be upgraded to support incorporation of new features and performance enhancements. The wand contains a laser, for example emitting an average of 60 mW of optical power at 658 nm. The ID is read when the MTP is placed within suitable proximity of the laser light. The light can be, for example, pulsed at 1 MHz; this feature can provide the data clock used by the MTP for synchronization of the transmitted ID data bits. The timing of the pulse groups can be set so that the duty cycles and average power levels fall within requirements for registration as a Class 3R laser device (see http://www.iec.ch/cgi-bin/proc-gi.pl/www/iecwww.p?wwwlang=english&wwwprog=cat-det.p&progdb=db1&wartnum=37864).

The resulting ID readout from the MTP can be rapid (less than 0.01 sec) and can be reported on the PC using application-specific software and connected, through software, to an inventory database(s). A performance parameter of the wand is its read volume; i.e., the space beyond its tip in which the ID can be read. This volume is a function of several variables, including illumination angle, illuminance energy, attenuation factors and tuning of the optical system's focal point. For example, it can be approximately 6 mm$^3$ (4 mm×1.5 mm×1 mm).

Electrical Design.

The clock signal from the laser can provide the carrier frequency used for emission of the serial ID number, therefore, the ID reader needs to house a laser power source. To recover the alternating magnetic field emissions from the MTP, a suitable coil that is made resonant at the operating frequency is used so as to maximize recovered signal voltage and reject out-of-band emissions. A low-noise differential amplifier provides gain with a high degree of common-mode rejection in order to preserve signal-to-noise ratio; the signal then proceeds to a voltage comparator. The binary sliced signal is then applied to a parallel processing decode engine realized in a field programmable gate array (FPGA). The decoder applies pattern-matching techniques to recognize elements of the incoming bitstream and extract the serial ID value. These signal tokens are then passed along to the host microprocessor, for example via a USB interface, for capture and presentation to the user. A safety switch can be used to inhibit laser operation in the absence of a vial to extend the life of the wand, and improve operational safety.

Conventional, passive RFID tags harvest power from the driving RF signal using antenna coils that are typically many centimeters in diameter. This setup results in up to approximately 1% efficiency of power transfer to the RFID device. In the case of those RFID methods that do not use such a large external antenna (such as the Hitachi mu-chip, now withdrawn from the market), the antenna efficiency drops by orders of magnitude, severely curtailing range and efficacy. Light energy harvested by photodiodes in the MTPs results in up to 10% efficiency in power transfer. Thus, because light-powered MTPs use energy more efficiently, they can achieve greater transmission ranges for the given small antenna size relative to pure RFID-based approaches. No other solution is smaller and more energy efficient.

It should be noted, however, that the invention can use any transponder affixed to a pin. such as the Hitachi mu-chip.

Further, the method of powering each MTP by a tightly focused laser beam allows specificity of physical addressing, i.e., addressing a dense array of tags in close proximity one tag at a time—an approach that is not feasible with conventional RFID methods. Using traditional RFID methods, multiple tags in close proximity will attempt to communicate simultaneously, mutually interfering with one another and preventing reading of the tags. This phenomenon is known as "RFID tag collision." An RF signal is only emitted from MTPs that are activated by the laser allowing precise positional specificity that can be applied to very small tube/plate systems such as the 384 well trays.

MTP features enable a high level of security. While some RFID technologies enable additional information content, MTPs are conveniently made to contain only an ID number. All other information related to the sample container can be stored in a secure database. Thus, nothing about the sample can be determined from the physical sample container itself. In addition, the benefits of the small form factor of the MTP antenna limits transmission range to less than 1 cm, so that unintended transmissions are not likely.

Device to Attach MTPs to Pins in Existing Entomology Collections

Figure 8:
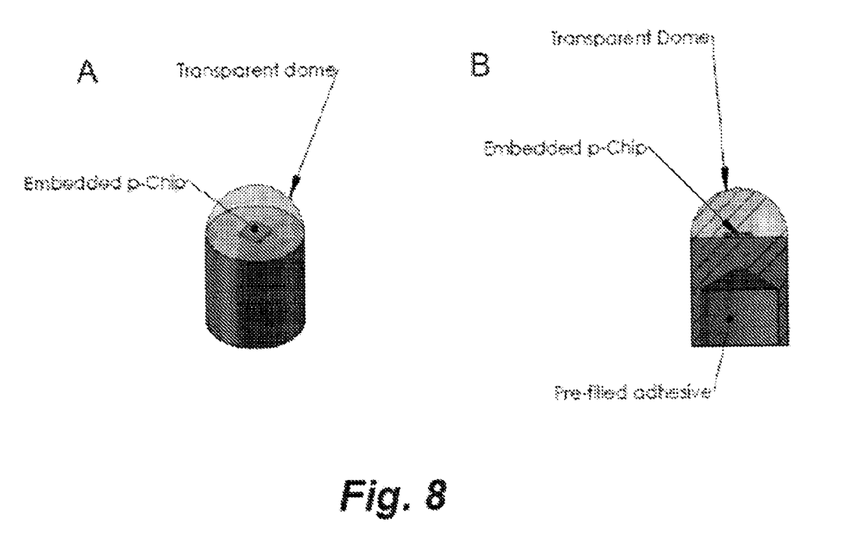
FIG. 8 shows a schematic drawing of an overlay attachment for insect pins. This attachment carries an embedded microtransponder. It is also referred to as a "hat" or a "cover" for heads of insect pins. Panel A gives an overall view of the attachment, and Panel B provides a cross-section.

Pins in existing entomology collections can be retrofitted with MTPs with a device resembling a small "hat", or a "cover" for the pin heads, carrying the MTP. The overlay device is depicted in FIG. 8. The overlay device consists of a plastic or metallic cover for the head of the insect pin. The MTP is embedded onto the cover. The overlay device can be preloaded on the underside with quick setting (e.g., drying) adhesive and mounted on wax paper, plastic release strips, or the like (not shown if figure, serving to protect the adhesive from prematurely drying). In some embodiments applying the overlay device to the pin causes the pin to pierce the covering. In some embodiments there are two layers of covering, with a polymerization catalyst situated between the layers such that piercing the covering provides the catalyst to the base adhesive to promote its setting by polymerization. In some embodiments, catalysts is dabbed for example on the pin head just prior to placing the overlay device. When a device is removed and placed on a pin, at that point the adhesive begins to dry. The collector (or archive person) mounts a "hat", indexes it, and then moves on to the next specimen. The overlay device, as shown in FIG. 8, is conical on the inside, such that it is "self-indexing" to be centered on the pin head.

Other mechanisms for attaching the overlay device include, for example, mechanical clamps or latches that clamp onto the pin or lock onto the pin head.

Other materials than plastic or metal can also be used to manufacture the overlay device or hat. Making the overlay device from ferrite can increase the read range of the MTP by increasing the magnetic field in the vicinity of the MTP and the hat.

The overlay device can be designed to have bands on the outside that provide a further indexing code—similar to the colored rings on resistors, or a barcode. Alternatively, the pin shaft itself may have the bands etched on them. The additional code (the bands) potentially provides a long term optical solution to address the issue of electronic obsolescence. The banding can encode the same number as is encoded on the MTP.

In certain embodiments, the MTP is oriented away from the pin, and along the axis of the pin (meaning that it can be read by pointing the reader roughly along the axis of the pin.

Testing Protocols for Pin/Chip/Glue Assembly

The MTP on a pin requires in situ testing, a clear understanding of the relevant entomological workflow, and some metrics from which comparisons can be made with alternative technologies and current practice. Here are the current procedures.

1. Measure of read reliability as deployed in collections:
    Average read distance from pin 10 times determined by 3-5 different people to test sensitivity to users and orientation of the pin.
    Testing of variability in manufacture/mounting, time to acquisition/database, in this case a database may be a spreadsheet, using a sample size of approximately 30 different pins.
    Additional qualitative observations regarding handling and use.
    Testing of the link to a collection database, focused on qualitative observations and notes about capabilities observed in situ.
2. Metrics for comparison with existing methods (versus annotated paper slips and barcodes). Key tests include:
    Time to acquisition
    Time to database
    Additional qualitative observations regarding handling and use.
    Link to a collection database, includes collecting qualitative observations and notes about capabilities observed in situ using the database.
3. Qualitative observations of current practice and procedures, including:
    Notes and observations on workflow, and layout of draws with particular note on variability.
    Observations and particulars of scenarios of importance, e.g. draws and mounting.
    Survey of repetitive strain experience of users.
4. Tests of archival properties of the glue, chip and pin assembly, including:
    Durability, e.g., a surrogate test for measuring fragility of the assembly.
    Handling, including a surrogate test for wear & tear.
    Aging of the assembly, including the following:
        surrogate test for the UV exposure,
        surrogate test for the rapid temperature cycling through anticipated ranges, including −20 used at times for pest treatment.
    Interaction with chemical agents, including an accelerated cycle exposure to acid and bases, and low but prolonged exposure to naphthalene (The air in many insect collections may have very high (saturated) concentrations of naphthalene). Testing may involve subjecting the assembly to dilute mists of nitric acid to simulate air pollution.
    Testing whether vibration has nay effect on the chip. Pinned insects are often sent through the post or otherwise subject to vibration in vehicles and aeroplanes.

Key Advantages

There is No Other RFID Tagging Method for Insect Pins.

The MTP is the first and only suitable RFID tag for insect pins.

Small Size.

The MTP is extremely small, just one half millimeter across and very thin. This permits mounting on the heads of pins, labels, etc. where it can be easily located for identification, but, practically speaking, are unnoticeable.

Ease of Use.

Mounting is performed by a single person using normal procedures. This can be rapidly taught to technicians with no prior experience.

More Rapid Searches.

The speed and convenience of reading using the laser ID Reader greatly reduces the time needed to sort through a collection to find a desired subject. Time is also reduced since information regarding each specimen is displayed on an easy-to-read computer screen rather than a small, hand written label.

Accuracy.

For collections, it is necessary to precisely identify samples. The large number of possible codes and error checking capabilities of the system eliminate any possible errors.

Cost Savings.

The MTP system will increase the reliability of tagging and tracking and reduce the cost of working with and recovering information regarding any type of specimen. The cost of the MTP itself is very low, an order of magnitude less than competing RFID tags, even when compared to some with inferior properties. The low cost is a result of mass-scale, fully automated production in state-of-the-art silicon foundries that are used to manufacture computer chips.

Reduced Damage to Collections.

The process of removing and replacing specimens on pins often damages the subjects themselves due to handling. The MTP system greatly reduces or eliminates this risk since the specimens do not need to be handled to be read.

Retrofit Capability for Existing Collection.

The ability to mount MTPs on hats makes it possible to retroactively tag existing specimens with minimal handling of fragile samples and thus provides a path to integrate legacy collections with new ones.

Others.

Additional advantages include an increased efficacy in specimen tracking and a reduction in repetitive strain for technicians.

Additional Pins

Tagged pins can be used to identify clothes, such as shirts, paper labels, documents, and the like. In some embodiments, nails and screws are pins. The microtransponder can conveniently be embedded in a cavity of the pin material to provide physical protection. Such nails or screws can be for high end uses, such as surgery or high value engineering (e.g., satellites) for which tagging can be particularly useful.

Other Tagged Objects

The microtransponders can also be affixed to jewelry in the manners described above. The microtransponder can be placed on a non-display side, and will thereby be very discrete. It can also in many cases be placed discretely on a display surface. The microtransponder can conveniently be embedded in a cavity of the jewelry frame material provide physical protection.

BIBLIOGRAPHY

1. Robinson E J H, Richardson T O, Sendova-Franks A B, Feinerman O, and Franks N R (2009) *Radio tagging reveals the roles of corpulence, experience and social information in ant decision making*. Behav Ecol Sociobiol, 63:627-6361; http://springerlink.com/content/17gp6553tv0q3015/.
2. Robinson E J H, Feinerman O and Franks N R (2009) *Flexible task allocation and the organisation of work in ants*. Proc. Royal Soc. London Series B, 276:4373-4380.
3. Robinson E J H, Smith F D, Sullivan K M E and Franks N R (2009) *Do ants make direct comparisons*?Proc. Royal Soc. London Series B, 276:2635-2641.
4. Lin X, Flint J, Azaro M, Coradetti T, Kopacka W, Streck D, Wang Z, Dermody J, and Mandecki W (2007) *Microtransponder-based multiplex assay for genotyping cystic fibrosis*. Clin Chem 53:1372-1376 http://www.clinchem.org/cgi/content/full/53/7/1372.
5. Mandecki W, Ardelt B, Coradetti T, Davidowitz H, Flint J, Huang Z, Kopacka W, Lin X, Wang Z, and Darzynkiewicz Z (2006) *Microtransponders, the miniature RFID electronic chips, as platforms for cell growth in cytotoxicity assays*. Cytometry Part A 69A:1097-1105 http://www3.interscience.wiley.com/cgi-bin/fulltext/113401375/PDFSTART.
6. PharmaSeq White Paper, *Tagging of Laboratory Mice Using p-Chips*, http://www.pharmaseq.com/pages/rfid.html.
20. http://www.nps.gov/history/museum/publications/conserveogram/11-08.pdf.
21. Borrer D. J., C. A. Triplehorn, and N. F. Johnson. 1989. An Introduction to the Study of Insects, 6th edition. Saunders College Publishing, San Francisco.
22. Dunn, Gary A. 1994. A Beginner's Guide to Observing and Collecting Insects. Young Entomologist's Society, Lansing, Mich.
23. Two suggested pin suppliers are: http://store.gardensare-.com/insect-pins.html and http://www.bioquip.com/html/view_catalog.asp?page=32.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

While the foregoing is directed to embodiments of the present invention, other and further embodiments of the invention may be devised without departing from the basic scope thereof, and the scope thereof is determined by the claims that follow. Any claim below that is written as dependent on an independent claim can also be written as dependent on any of the claims under such independent claim, except where logic forecloses such a dependency.

What is claimed is:

1. An assembly comprising a plastic or metal pin with a transponder affixed thereto, wherein the transponder is a light-triggered MTP comprising a photocell on one face, wherein the pin has a main axis, a length along that main axis, two ends, including an end that is sharpened, and having at the other end a head with a width extending through the main axis, wherein the pin with the exception of the head is smooth and has a diameter of about 1/10 inch or less, wherein the head width is substantially smaller than the pin length, wherein the largest of height, length, and width of the MTP is 1.2 mm or less, wherein the length and width defines an attachment area, wherein for a metal pin the MTP is adhered to a flat surface that encompasses the attachment area, and there is a transparent or semi-transparent polymer, adhesive, hybrid glass or sputtered silica covering and encasing the MTP, wherein the MTP is affixed with the photocell face oriented to be read through the transparent or semi-transparent polymer, adhesive, hybrid glass or sputtered silica, wherein for a plastic pin the MTP is embedded in the plastic, and wherein the plane in which the transponder resides is approximately perpendicular to the axis of the pin, such that the MTP must queried with triggering light from above the pin head.

2. The assembly of claim 1, wherein the pin is plastic.

3. The assembly of claim 1, wherein the pin comprises identification banding.

4. An overlay device comprising a body adapted to (a) adhere, clamp or lock over and (b) engulf the head of a pin, the body comprising a transponder that is a light-triggered MTP, wherein the pin has a main axis, a length along that main axis, two ends, including an end that is sharpened, and having at the other end a head with a width extending from the main axis, wherein the head width is substantially smaller than the pin length.

5. The overlay device of claim 4, wherein the MTP is oriented away from the pin, and along the main axis of the pin, such that the MTP must be queried with triggering light from above the pin head.

6. The overlay device of claim 4, comprising a conical shape in a channel configured to center a pin when such pin is fitted into the overlay device at the pin head end.

7. The overlay device of claim 6, further comprising rapid setting adhesive provided in the channel, the rapid setting adhesive protected from setting prior to application to a pin by a covering.

8. A method of use of the assembly of claim 1 comprising:
(a) providing a labeling device which is the assembly;
(b) providing the labeling device physically linked to the object being tagged by the labeling device being impaled, utilizing the sharpened end, through the object, or through part of the object;

(c) reading the ID of the transponder by directing at it the light radiation emitted by a dedicated electronic reader capable of processing the signal sent by the transponder.

9. A method of use of the assembly of claim 8, according to which the object being tagged is an insect.

10. A method of use of the assembly of claim 8, according to which the object being tagged is clothing, a paper label, or a document.

11. A method of use of the assembly of claim 8 according to which the ID of each pin is linked to an entry in a computer database for providing detailed information about the object attached to the pin.

12. The overlay device of claim 4, further comprising identification banding.

13. The overlay device of claim 7, further comprising a second covering, and a polymerization catalyst situated between the first and second covering, such that piercing the coverings with a pin head provides the catalyst to the rapid setting adhesive to promote setting the rapid setting adhesive by polymerization.

14. The assembly of claim 1, wherein the largest of height, length, and width of the MTP is 0.6 mm or less.

15. The assembly of claim 2, wherein the largest of height, length, and width of the MTP is 0.6 mm or less.

16. The method of claim 8, wherein in the assembly the largest of height, length, and width of the MTP is 0.6 mm or less.

17. The overlay device of claim 4, wherein the largest of height, length, and width of the MTP is 1.2 mm or less.

18. The overlay device of claim 4, wherein the largest of height, length, and width of the MTP is 0.6 mm or less.

* * * * *